United States Patent [19]

Zinn

[11] Patent Number: 4,691,733

[45] Date of Patent: Sep. 8, 1987

[54] UNDERCOVER VALVE COVER ASSEMBLY AND VALVE SUPPORT

[75] Inventor: Frank R. Zinn, Culpeper, Va.

[73] Assignee: Bingham & Taylor, Culpeper, Va.

[21] Appl. No.: 881,778

[22] Filed: Jul. 3, 1986

[51] Int. Cl.[4] .............................................. F16L 5/00
[52] U.S. Cl. .................................... 137/364; 137/371; 52/20
[58] Field of Search ............... 137/364, 365, 366, 367, 137/368, 369, 370, 371; 52/20

[56] References Cited

U.S. PATENT DOCUMENTS

| | | | |
|---|---|---|---|
| 613,652 | 11/1898 | Chadbourne | 137/365 |
| 3,548,864 | 12/1970 | Handley et al. | 137/364 |
| 3,901,271 | 8/1975 | Stewart | 137/364 |
| 4,030,519 | 6/1977 | Zinn | 137/364 |
| 4,102,088 | 7/1978 | Keller et al. | 52/20 |
| 4,308,886 | 1/1982 | Handley et al. | 137/364 |
| 4,310,015 | 1/1982 | Stewart et al. | 137/364 |

FOREIGN PATENT DOCUMENTS 1176622 4/1959 France ............................... 137/364

*Primary Examiner*—A. Michael Chambers
*Attorney, Agent, or Firm*—Cushman, Darby & Cushman

[57] ABSTRACT

A valve cover assembly and support member having opposed slots extending downwardly from the upper end thereof and extending into the lower end of a conventional valve cover to lock the valve against rotation and hold the valve in an upright position.

5 Claims, 6 Drawing Figures

U.S. Patent  Sep. 8, 1987  Sheet 1 of 2  4,691,733

UNDERCOVER VALVE COVER ASSEMBLY AND VALVE SUPPORT

BRIEF DESCRIPTION OF THE PRIOR ART AND SUMMARY OF THE INVENTION

The invention relates to a valve cover assembly for covering a buried valve for a pipe section and permitting access thereto and to a valve support member for use in such assembly.

Valve covers are commonly used for access to buried valves of pipe sections. Such covers usually constitute an elongated hollow housing capped at the upper end by a cast iron collar or the like, which cap can be removed by a properly authorized person to permit access to the the valve, for example by a wrench. Such housings are conventionally constructed of metal, plastic and other similar materials. Opposing slots extend upwardly from the lower end through which the pipe portions adjacent the valve extend so that the valve is disposed within the cover. Typically the valve is supported from the bottom by a base which cradles the valve. The U.S. Pat. Nos., to Zinn, 3,676,569 and 4,030,519 show typical covers of this type. U.S. Pat. No. 3,901,271 shows another valve cover of this type.

The present invention relates to an improved valve cover assembly in which a valve support member is provided, preferably in combination with a conventional type of valve cover to hold the valve against horizontal, vertical or rotary movement. The valve support member has opposed slots extending downwardly from its upper end and extends into the lower end of a conventional valve cover with the pipe passing through the respective slots of each of the cover end member and the valve support. The surfaces of the valve support member which surround the valve lock the valve in an upright position and also prevent rotation in a horizontal plane. The lower end of the support member is preferably provided with an outwardly extending portion that mates with the slots in the valve cover thereby preventing rotation of the valve support and cover with respect to each other. Preferably the portion of the slots of the valve support member extending about the pipe sections or valve body is closely contoured to the dimensions of that valve body or pipe section to grip the valve body or pipe section.

Other objects and purposes of the invention will be clear from the following detailed description of the drawings.

DETAILED DESCRIPTION OF THE DRAWINGS

Figure 1:
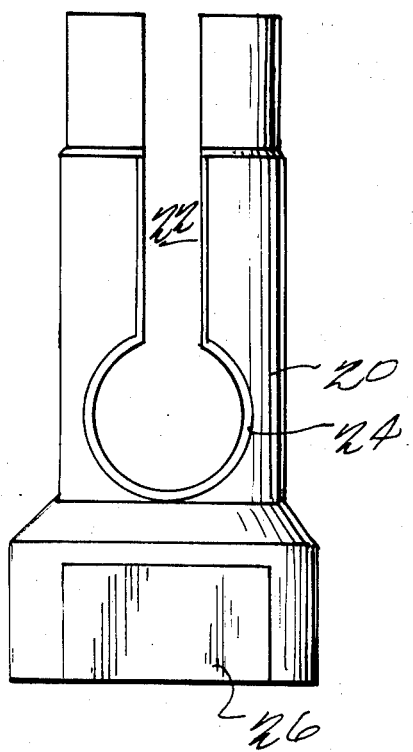
FIG. 1 shows a side view of a valve support member of the present invention.
Figure 2:
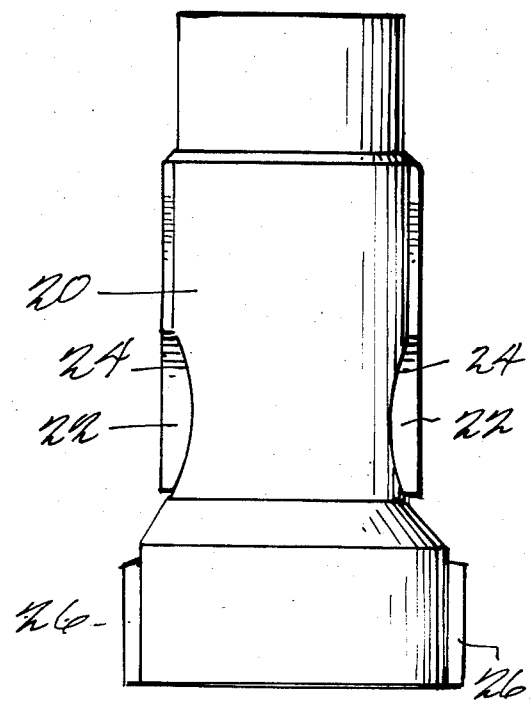
FIG. 2 shows a front view of the valve support member.
Figure 3:
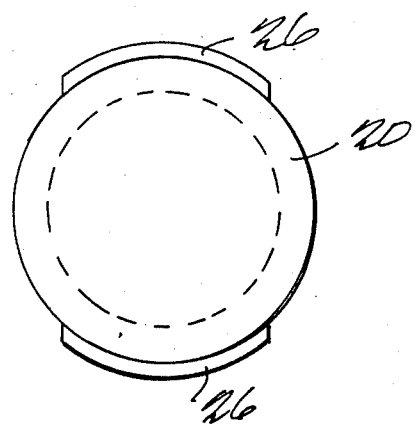
FIG. 3 shows a top view of the valve support member.

Reference is now made to FIGS. 1–3 which illustrate a side, front and top view of the valve support member of the present invention as will be described below. Valve support member 20 fits within a conventional cover to provide access to a buried valve and is preferably molded of plastic or any other suitable material. Slots 22 extend downwardly from the upper end of member 20 and are contoured at respective lower ends 24 to the shape of the required valve body which is to be locked into position and grip that portion.

Figure 6:
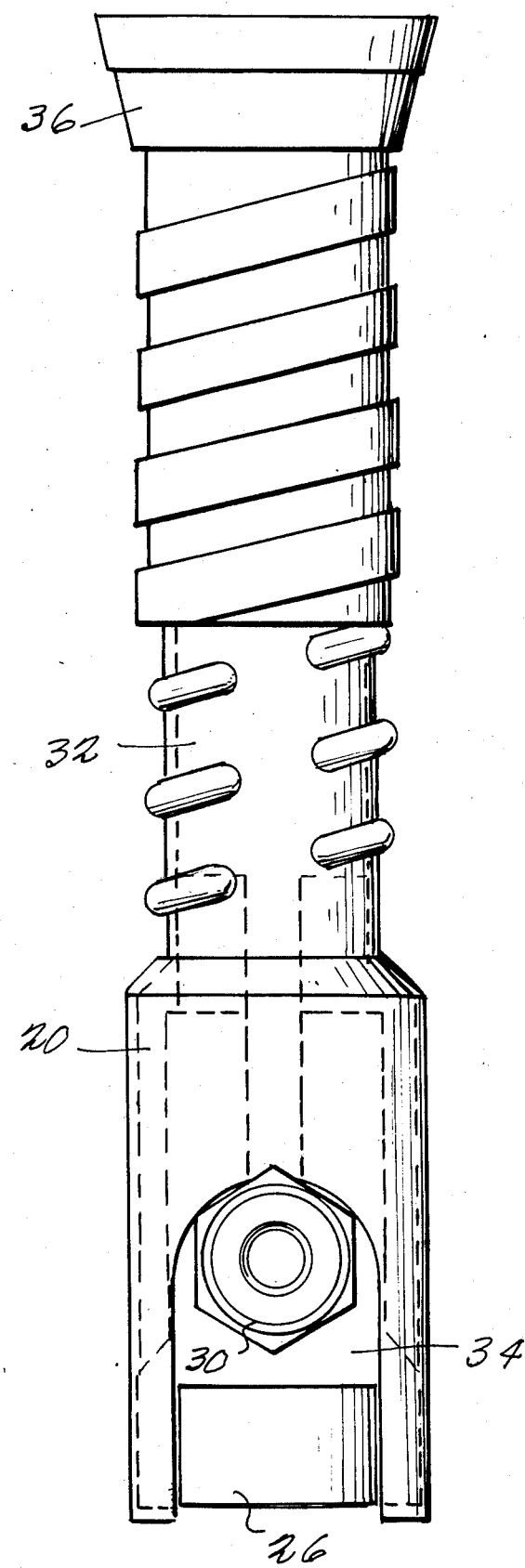
FIG. 6 shows a side view of the valve cover assembly of the present invention.

As can be seen in FIG. 3, member 20 is of generally circular configuration. The lower portion of member 20 is of slightly greater cross-section and as can be seen in FIG. 6 fits snugly within the end of a conventional valve cover. Outwardly extending portions 26 on opposing sides of member 20 extend into the slots of the cover as described below to lock the member 20 and the cover firmly together.

Figure 4:
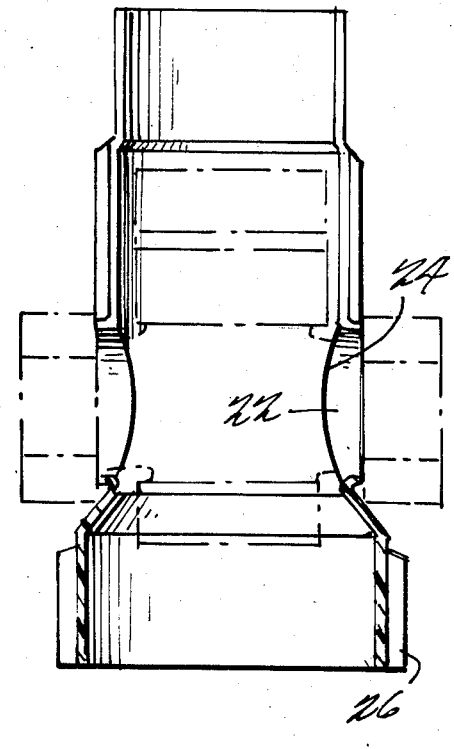
FIG. 4 shows a front view of a valve support member with a valve disposed therein.
Figure 5:
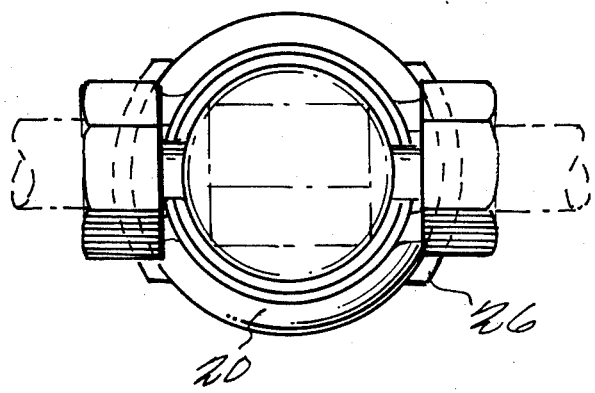
FIG. 5 shows a top view of the valve support member with a valve disposed therein.

As can be best seen in FIGS. 4 and 5, the widest portions of valve 30 contact or are closely adjacent to surfaces of the support member 20.

As can be best seen in FIG. 6, member 20 extends into the lower end of a conventional two-piece cover 32, also preferably molded of a suitable plastic. Slots 34 extend upwardly from the lower end of cover 32 through which the pipe sections on either side of the valve assembly can extend to dispose the valve assembly within member 32 and above the lower end thereof. The outwardly extending portions 26 of member 20 extend into slots 34 to lock the member 20 and cover 32 together and prevent rotation of either. Member 32 is preferably capped at the top by a conventional cast iron cap 26. Member 32 is formed of any suitable length and dimensions required by specific applications and valves.

Many changes and modifications in the above-described embodiment can of course be carried out without departing from the scope thereof. The shape of the cover and support can be chosen as desired. Accordingly, that scope is intended to be limited only by the scope of the appended claims.

What is claimed is:

1. A valve cover assembly for covering a buried valve for a pipe section and permitting access thereto comprising:

a hollow elongated valve cover means having a pair of opposed longitudinal slots therein extending upwardly from a lower end thereof;

a valve support member adapted for slidingly receiving said valve cover means having opposed longitudinal slots extending downwardly from an upper end thereof, and a pair of outwardly extending portions beneath said opposed slots of said valve support member and extending from opposite sides of a lower portion of said valve support member, said outwardly extending portions having a width which is less than the width of said opposed longitudinal slots of said valve cover means;

whereby a valve member having pipe extending outwardly from both sides thereof may be placed within said valve support member with said pipe being disposed within said opposed slots of said valve support member, and said valve cover means may be slid over said valve support member, said longitudinal slots of said valve cover means providing a passage through which the outwardly extending pipe passes, and tightly receiving said outwardly extending portions so as to secure the valve cover means firmly to said valve support member.

2. A valve cover assembly according to claim 1, wherein said pair of outwardly extending portions of said valve support member are directly beneath and have a common plane of symmetry with the opposed longitudinal slots in said valve support member.

3. An assembly as in claim 1 wherein the surfaces of said opposed slots of said support member are contoured to conform closely to said valve and lock said valve in an upright position.

4. An assembly as in claim 1 wherein said cover and support member are of molded plastic.

5. An assembly as in claim 1 further including a metal cap fixed to the upper end of said valve cover means.

* * * * *